United States Patent
Liu et al.

(10) Patent No.: US 11,615,190 B2
(45) Date of Patent: Mar. 28, 2023

(54) SECURE BOOT POLICY FOR PLATFORM SECURITY USING NEUTRAL PROCESSORS IN AN INFORMATION HANDLING SYSTEM

(71) Applicant: Dell Products L.P., Round Rock, TX (US)

(72) Inventors: Wei G. Liu, Austin, TX (US); Po Yu Cheng, Tainan (TW)

(73) Assignee: Dell Products L.P., Round Rock, TX (US)

( * ) Notice: Subject to any disclaimer, the term of this patent is extended or adjusted under 35 U.S.C. 154(b) by 127 days.

(21) Appl. No.: 17/443,101

(22) Filed: Jul. 20, 2021

(65) Prior Publication Data
US 2023/0027315 A1 Jan. 26, 2023

(51) Int. Cl.
*G06F 11/22* (2006.01)
*G06F 21/57* (2013.01)

(52) U.S. Cl.
CPC ........ *G06F 21/575* (2013.01); *G06F 11/2284* (2013.01)

(58) Field of Classification Search
CPC ............................ G06F 21/575; G06F 11/2284
See application file for complete search history.

(56) References Cited

U.S. PATENT DOCUMENTS

| | | | | |
|---|---|---|---|---|
| 10,620,859 | B2* | 4/2020 | Manvar | G06F 3/0679 |
| 2013/0159729 | A1* | 6/2013 | Thom | G06F 21/572 |
| | | | | 713/189 |
| 2016/0180094 | A1* | 6/2016 | Dasar | G06F 9/4406 |
| | | | | 714/36 |
| 2018/0349607 | A1* | 12/2018 | Khatri | G06F 21/575 |
| 2022/0092187 | A1* | 3/2022 | Tonry | G06F 21/33 |
| 2022/0121259 | A1* | 4/2022 | Peng | G06F 13/4022 |
| 2022/0121749 | A1* | 4/2022 | Liu | G06F 21/575 |

* cited by examiner

*Primary Examiner* — Zahid Choudhury
(74) *Attorney, Agent, or Firm* — Norton Rose Fulbright US LLP (57) ABSTRACT

A secure boot policy may be stored in the information handling system and used to create a trusted relationship with a CPU, including a neutral CPU that has not been fused with an OEM key. The secure boot policy may be a data blob including platform-specific identification information (e.g., one or more of flash memory unique ID, motherboard ePPID), a boot policy (e.g., specifying to enable or disable neutral CPU fusing), and a signature. The secure boot policy may be stored in a one-time-programmable (OTP) storage of the information handling system, such as an OTP region in the serial peripheral interface (SPI) flash memory part storing the basic input/output system (BIOS). The BIOS may verify the secure boot policy using a public key and check if the boot policy is bound to current BIOS flash part and/or system configuration, and then apply the boot policy if the verification is passed.

20 Claims, 4 Drawing Sheets

SECURE BOOT POLICY FOR PLATFORM SECURITY USING NEUTRAL PROCESSORS IN AN INFORMATION HANDLING SYSTEM

FIELD OF THE DISCLOSURE

The instant disclosure relates to information handling systems. More specifically, portions of this disclosure relate to security of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Security on information handling systems is used to reduce malicious attacks against operators of the information handling system. Security measures can reduce the likelihood of a malicious attacker receiving copies of private data that are not intended for public release and/or reduce the likelihood of a malicious attacker taking over an information handling system and using the system to interrupt valid operations occurring on other information handling systems on the same network. Some security solutions include physical binding of hardware to create a trusted relationship between components in the information handling system, such as between a central processing unit (CPU) and a motherboard. The trusted relationship can reduce the likelihood of an information handling system inadvertently executing untrusted applications that could be embedded in untrusted hardware.

SUMMARY

The physical binding of hardware components can result in an inability to re-use hardware components between information handling systems. For example, a central processing unit (CPU) may include a set of fuses or other one-time programmable memory that are fused with an identifier to pair the CPU with a motherboard or other hardware component or configuration. The fusing of the CPU can improve security by reducing the likelihood that a malicious attacker swaps the CPU in an information handling system with another CPU containing malicious code because the information handling system establishes a trusted relationship with the fused CPU that does not exist with another CPU. Shortcomings mentioned here are only representative and are included to highlight problems that the inventors have identified with respect to existing information handling systems and sought to improve upon.

Aspects of the information handling systems described below may address some or all of the shortcomings as well as others known in the art. Aspects of the improved information handling systems described below may present other benefits than, and be used in other applications than, those described herein. A secure boot policy may be stored in the information handling system and used to create a trusted relationship with a CPU, including a neutral CPU. A neutral CPU refers to a CPU that has not been fused or otherwise irreversibly configured to create a specific trust relationship. The secure boot policy may be a data blob including platform-specific identification information (e.g., one or more of flash memory unique ID, motherboard ePPID), a boot policy (e.g., specifying to enable or disable neutral CPU fusing), and a signature. The secure boot policy may be stored in a one-time-programmable (OTP) storage of the information handling system, such as an OTP region in the serial peripheral interface (SPI) flash memory part storing the basic input/output system (BIOS), sometimes referred to as a BIOS flash part.

An embodiment of the disclosure may include, first, configuring the secure boot policy on the information handling system in the factory phase construction of the information handling system prior to delivery to a customer and, subsequently, allowing the customer to install a neutral CPU and operate the information handling system without fusing the neutral CPU, while still maintaining an improved level of security of the information handling system. In one embodiment, configuration of the information handling system in the factory phase may include the secure boot policy being loaded onto the system with the policy including the unique ID of the BIOS flash part such that the secure boot policy is bound to an individual BIOS flash part, the secure boot policy being signed with a private key of the manufacturer so the integrity and authenticity can be verified, and the secure PSB policy being written to an OTP region in the flash part so the data will be present permanently and cannot be altered. After delivery to the customer, the customer may install a neutral CPU in the information handling system, the BIOS may verify the secure boot policy using a public key and check if the boot policy is bound to current BIOS flash part and/or system configuration, and then the BIOS applies the boot policy to the neutral CPU if the verification is passed. If the boot policy has fusing disabled, then the BIOS will not permanently fuse the CPU and boot the system normally.

In some embodiments, additional flexibility may be provided by allowing customers who opted out of a secure boot security initially to be able to change their mind and enable a secure boot policy after delivery of the information handling system by introducing a BIOS setup option for enable/disable the secure boot policy. With the secure boot policy disabled, a default boot policy may be used, which may result in fusing of a neutral CPU. With the secure boot policy enabled in the BIOS configuration, the choice to fuse or not fuse may be provided through a BIOS setup option.

In some embodiments, the secure boot policy may be compatible with a Platform Secure Boot (PSB) configuration that uses an immutable Platform Secure Processor (PSP) on-chip ROM firmware to validate the integrity of the system ROM firmware (BIOS). With PSB, an original equipment manufacturer (OEM) vendor ID and model ID are one-time fused on the CPU System-on-Chip (SoC). The PSP firmware uses the certificate which includes matched vendor ID and model ID and signed by PSP root key to authenticate the BIOS initial boot block code. If the BIOS code is corrupted or compromised, the PSP will not allow the information handling system to boot. The PSB allows the OEM to establish an unbroken chain of trust from the processor's silicon-based root of trust to the OEM's BIOS on the motherboard (or other system configuration), and then from the OEM's BIOS to the OS Bootloader using UEFI secure boot. This provides defense against remote attackers seeking to embed malware into a platform's firmware. The use of the secure boot policy according to embodiments described herein may provide a similar level of trust between the CPU SoC and the OEM equipment along with providing the user a choice of whether to fuse the CPU or not fuse the CPU, while providing a similar level of security even when the CPU is not fused.

According to one embodiment, a method includes determining, by a processor executing a Basic Input/Output System (BIOS) system firmware stored in a non-volatile memory (such as a BIOS flash part) after initiating a power-on self-test (POST), that a processor coupled to the non-volatile memory is a neutral processor; determining, by the BIOS in response to the processor being determined to be a neutral processor, whether a secure boot policy is present in the non-volatile memory; and in response to determining that the secure boot policy is present in the non-volatile memory, performing steps to apply either a secure boot policy or a default boot policy to the neutral CPU based on whether the secure boot policy is determined to be present in the non-volatile memory. The steps for applying a boot policy in response to determining that the secure boot policy is present in the non-volatile memory may include one or more of determining whether the secure boot policy is authentic; assigning a default boot policy to the neutral processor in response to the determining whether the secure boot policy is authentic indicates the secure boot policy is not authentic; and/or assigning the secure boot policy to the neutral processor in response to the determining whether the secure boot policy is authentic indicates the secure boot policy is authentic.

In certain embodiments, the method may include assigning the default boot policy to the neutral processor in response to determining that the secure boot policy is not present in the non-volatile memory; receiving a user input indicating whether to fuse the neutral processor after assigning the default boot policy; booting an operating system without fusing the neutral processor based on the user input; receiving a user input indicating whether to fuse the neutral processor after assigning the default boot policy; fusing the neutral processor with an original equipment manufacturer (OEM) key based on the user input to configure the neutral processor to establish a chain of trust from a root of trust of the neutral processor to the BIOS and from the BIOS to an operating system; and/or booting the operating system after fusing the neutral processor.

In some embodiments, determining whether the secure boot policy is authentic may include determining whether a signature on the secure boot policy is valid based on a public key; determining whether the secure boot policy is authentic may include determining whether platform-specific identification information of the secure boot policy matches identification information associated with an information handling system in which the neutral CPU is installed; determining whether platform-specific identification information matches the information handling system may include determining whether a motherboard electronic piece part identification (ePPID) of the secure boot policy matches identification information associated with a motherboard of the information handling system; and/or determining whether a secure boot policy is present in a non-volatile memory may include determining whether the secure boot policy is present in a one-time-programmable (OTP) storage of the non-volatile memory.

According to another embodiment, an information handling system may include a processor and a non-volatile memory, such as a BIOS flash part, coupled to the processor. The non-volatile memory may include a system firmware, such as BIOS, for initializing the information handling system and booting an operating system or executing applications on the processor. The processor may be configured to execute instructions from the system firmware stored in the non-volatile memory, in which executing the system firmware configures the processor to perform one or more steps or embodiments of the methods described herein.

According to some embodiments, the method may be embedded in a computer-readable medium as computer program code comprising instructions that cause a processor to perform operations corresponding to the steps of the method. For example, the computer readable medium may be BIOS instructions that cause the processor upon power-on or start-up of the information handling system to perform one or more steps or embodiments of the methods described herein.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
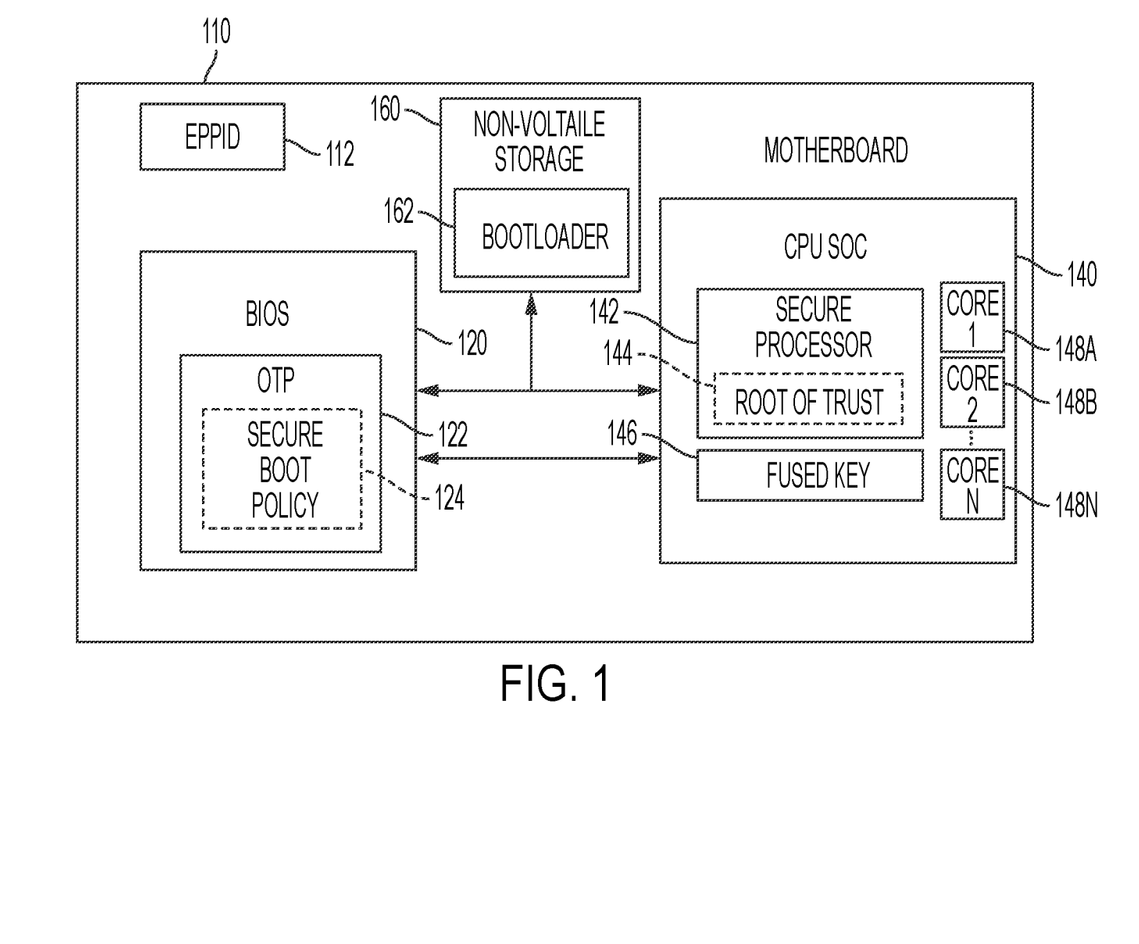
FIG. 1 is a block diagram illustrating components of an information handling system involved in booting the information handling system according to some embodiments of the disclosure.

FIG. 1 is a block diagram illustrating components of an information handling system involved in booting the information handling system according to some embodiments of the disclosure. A motherboard 110 may be a component in an information handling system that couples one or more devices within the system together for communication, delivery of power, and/or other functionality. The motherboard 110 may be, for example, a printed circuit board (PCB) with conductive traces through several layers of the PCB that couple devices, such as non-volatile storage 160, BIOS flash part 120, and CPU SOC 140, together for communication between the devices and to supply power from a common power source to the devices. The motherboard 110 may include one or more daughterboards that include other devices that are configured to couple to the motherboard 110 and other devices coupled to the motherboard 110. The motherboard 110 may be identified by an electronic piece part identification (ePPID) 112 that is programmed into a non-volatile storage (e.g., ROM) and read by the BIOS flash part 120 through an Intelligent Platform Management Interface (IPMI).

The BIOS flash part 120 may include non-volatile memory, such as a read-only memory (ROM), a programmable ROM (PROM), or other memory device that stores firmware including computer instructions that when executed by the information handling system configured the system to perform hardware initialization during the booting process (e.g., power-on startup (POS)), and to provide runtime services for operating systems and programs executing after the hardware initialization. The BIOS may be the first computer instructions executed by the information handling system when powered on. The BIOS 120 in some embodiments may be compatible with the Unified Extensible Firmware Interface (UEFI). The BIOS 120 may include a one-time-programmable (OTP) portion 122 of memory. A secure boot policy may be loaded into the OTP portion 122 of the BIOS 120 by an OEM before delivery of the parts to a customer. The secure boot policy may be used to establish a trusted relationship, such as in binding, the BIOS flash part 120 to the motherboard 110 based on, for example, the EPPID 112.

The CPU SOC 140 may be coupled to the motherboard 110 through a package interface array, such as a plurality of bins or balls that couple circuitry of the CPU SOC 140 to the traces in the motherboard 110, and through the traces to other devices coupled to the motherboard 110. The CPU SOC 140 may include one or more CPU cores 148A-N configured for executing applications based on computer instructions retrieved from, for example, non-volatile storage 160. The CPU SOC 140 may also include a secure processor 142 that establishes a silicon-based root of trust 144 for securing the CPU SOC 140 to the motherboard 110 to reduce the likelihood of a successful attack from malicious attackers. The root of trust 144 may be embedded in an on-chip boot ROM of, for example, the secure processor 142, as a root signing key, such as a SHA256 or SHA384 root signing key. The on-chip boot ROM of may load an off-chip boot loader from the BIOS flash part 120, which may be signed by a hardware vendor. If a secure boot is enabled by a fused value in the portion 146, the secure processor 142 may authenticate the BIOS initial boot block code by using the root of trust 144. If a secure boot is not enabled because the portion 146 is unfused, the root of trust 144 may be bypassed for other authentication techniques, such as described in embodiments of this disclosure. The CPU SOC 140 may include a fused key portion 146 as part of security measures applied by the secure processor 144. The fused key portion 146 may be a one-time-programmable set of fuses or other devices that may be fused with data that locks the CPU SOC 140 to only work with a particular information handling system configuration, such as a particular motherboard 110 and/or a particular BIOS flash part 120. A neutral CPU may have an empty, or unfused, fused key portion 146. Conventionally, when an information handling system is powered on with a neutral CPU, the fused key portion 146 is immediately fused to lock the CPU SOC 140 to the information handling system. If a CPU with a fused key is moved from one information handling system to another information handling system, then the CPU may not operate correctly. If a CPU with a fused key in an information handling system is replaced with a different CPU, then the information handling system may not operate correctly. This security measures may reduce the likelihood of an information handling system executing malicious code that exposes data in, for example, the non-volatile storage 160 to unauthorized users.

Non-volatile storage 160 may be, for example, a hard disk drive (HDD), a solid-state drive (SSD), and/or other non-transitory computer readable medium storing instructions for an operating system and/or applications for execution by the information handling system. The non-voltage storage 160 may be attached to the motherboard 110 and coupled to the CPU SOC 140 through traces of the motherboard 140. The non-volatile storage 160 may additionally include or alternatively be storage installed in a chassis with the motherboard 110 and coupled to the CPU SOC 140 through a controller, such as a serial ATA (SATA) controller, attached to the motherboard 110. The storage 160 may include a special portion of storage including a bootloader 162. The bootloader 162 may be executed by the CPU SOC 140 upon completion of a start-up or power-on sequence defined by the BIOS 120. For example, after a level of confidence is reached in the security of the information handling system including the CPU SOC 140 and BIOS 120, the CPU SOC 140 may execute the bootloader 162 to load an operating system from the non-volatile storage 160 and begin execution of the operating system to, for example, load a graphical user interface (GUI) allowing the user to execute applications on the CPU SOC 140.

Figure 2:
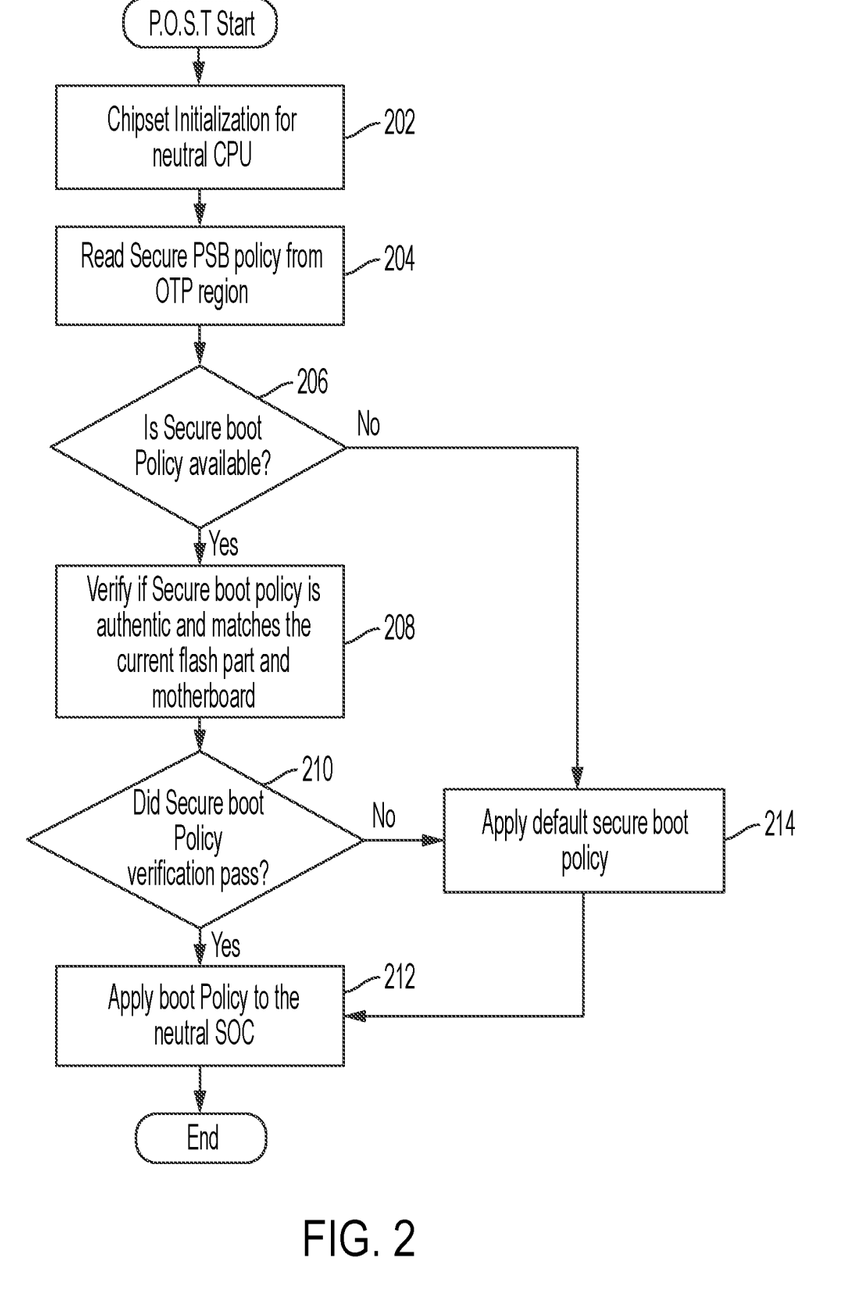
FIG. 2 is a flow chart illustrating a method for applying a boot policy to an information handling system according to some embodiments of the disclosure.
Figure 3:
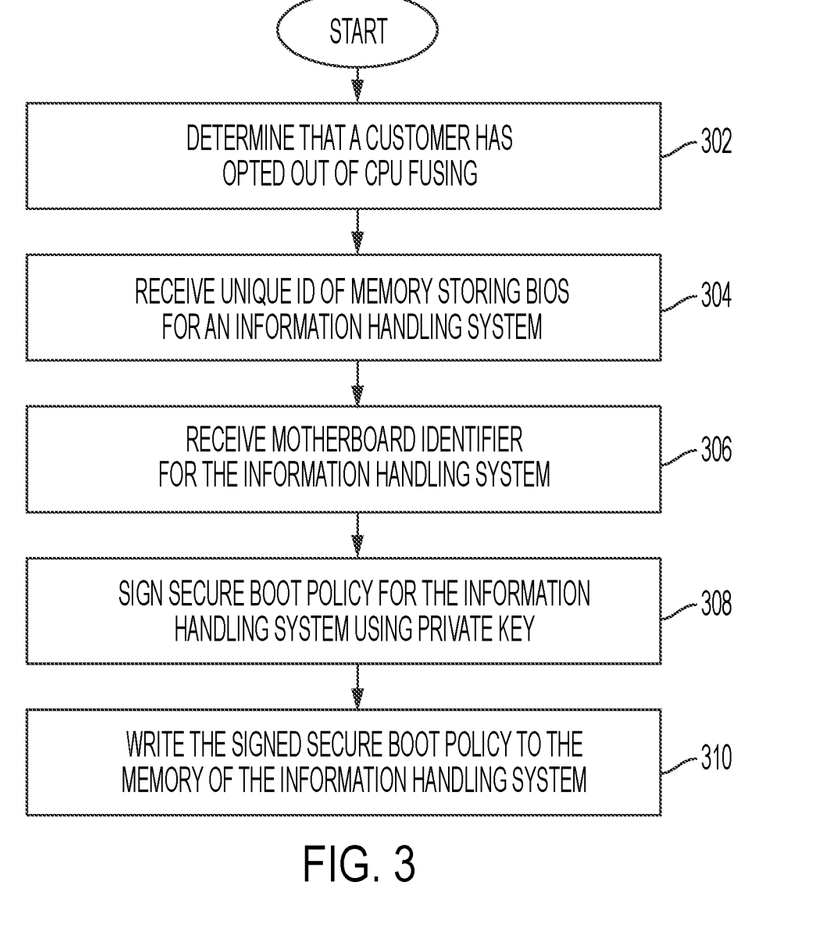
FIG. 3 is a flow chart illustrating a method for assembling an information handling system to enable boot policy configurations according to some embodiments of the disclosure.

Alternatively, or additionally to the fused key portion 146, security measures may be provided in the BIOS flash part 120. In some embodiments, the secure boot policy 124, which may be stored in the OTP portion 122 of the BIOS flash part 120 may be used to secure the information handling system without fusing the fused key portion 146 of the CPU SOC 140. The use of the secure boot policy 124 thus allows the swapping of the CPU SOC 140, such as to test other CPU SOCs or to replace faulty CPU SOCs, while still maintaining a level of security within the information handling system. FIG. 2 and FIG. 3 illustrate flow charts for methods that use a secure boot policy, such as policy 124. FIG. 2 illustrates operation of an information handling system by a customer of an OEM to use a secure boot policy, and FIG. 3 illustrates preparation of an information handling system by the OEM for sale to a customer to use a secure boot policy.

Referring now to FIG. 2, FIG. 2 is a flow chart illustrating a method for applying a boot policy to an information handling system according to some embodiments of the disclosure. A method 200 may begin with a start of a power-on self-test (POST) by the BIOS, such as when an information handling system is first powered on or is rebooted. After POST, a chipset initialization is begun that detects the presence of a neutral CPU at block 202. In response to detecting a neutral CPU, the information handling system attempts to read a secure boot policy (e.g., a platform secure boot (PSB)-compatible policy) from a secure memory location, such as a one-time-programmable (OTP) region of memory, at block 204. At block 206, the information handling system determines if the secure boot policy was identified in the secure memory location. If a secure boot policy is determined to be present, then the secure boot policy is verified at block 208. Block 208 may include determining if the secure boot policy is authenticated by using a public key to check a signature of the secure boot policy. Block 208 may also or alternatively include determining if the secure boot policy matches a BIOS flash part and/or motherboard currently installed in the information handling system.

At block 210, the verification of block 208 is determined to pass or fail. If the secure boot policy is verified, then the method 200 continues to block 212 to apply the secure boot policy to the neutral CPU. The secure boot policy may specify an enable or disable for fusing a neutral CPU. If the secure boot policy specifies enabling fusing of the neutral CPU, then the application of the secure boot policy at block 212 may include fusing the neutral CPU with a key corresponding to the information handling system. If the secure boot policy specifies disabling of the neutral CPU, then the application of the secure boot policy at block 212 may result in not fusing the neutral CPU. In some embodiments, the secure boot policy may specify allowing the user to choose whether to fuse or not fuse the neutral CPU. The use of the secure policy in the method 200 may allow the neutral CPU to be used by the information handling system without fusing the CPU in a manner that prevents the CPU from being re-used in other information handling systems.

If the secure boot policy is determined to be not present at block 206 or the secure boot policy is determined to not pass verification at block 210, then a default secure boot policy may be determined at block 214. The default secure boot policy is then applied to the neutral CPU at block 212. The default boot policy may involve fusing a neutral CPU upon power-on, such as by fusing the neutral processor with an original equipment manufacturer (OEM) key based on the user input to configure the neutral processor to establish a chain of trust from a root of trust of the neutral processor to the BIOS and from the BIOS to an operating system. In some embodiments, deferred fusing may be provided as part of the default boot policy to allow a user to manually delay the fusing at each chipset initialization involving the default boot policy. The inclusion of a default boot policy for application at block 212 allows the information handling system to be configurable, such as to accommodate specific customer orders, by supporting choices for operation of the information handling system without fusing neutral CPUs or defaulting to the fusing of the neutral CPUs.

The operation of the information handling system with a secure boot policy may be supported by a particular assembly process by an OEM, such as at a factory, prior to delivery of the information handling system to a customer who powers-on the information handling system with the neutral CPU. FIG. 3 is a flow chart illustrating a method for assembling an information handling system to enable boot policy configurations according to some embodiments of the disclosure. A method 300 may begin at block 302 with determining that a customer has opted out of neutral CPU fusing for an information handling system for delivery to the customer. At block 304, a unique identifier for the memory storing the BIOS, such as a BIOS flash part, is received. At block 306, a motherboard identifier, such as an ePPID, is received. At block 308, a secure boot policy is created, with the secure boot policy specifying the disabling of neutral CPU fusing for the information handling system including a configuration specifying one or more of the motherboard identifier and/or the BIOS flash part identifier, and the secure boot policy may be signed using a private key of the OEM building the information handling system. At block 310, the secure boot policy is written to a secure memory of the information handling system, such as an OTP region of the BIOS flash part. The BIOS flash part of the information handling system may include firmware instructions for configuring the information handling system in accordance with the secure boot policy, such as by executing the method 200 of FIG. 2.

These example embodiments describe and illustrate various methods to bind a secure boot policy, such as a Platform Secure Boot (PSB) policy, to the information handling system platform to allow customers to securely opt-out of neutral CPU fusing. The PSB policy allows the OEM to establish an unbroken chain of trust from a silicon-based root of trust in the neutral CPU to the OEM's BIOS, and then from the OEM's BIOS to the OS Bootloader using, for example, a UEFI secure boot process. Embodiments of this security arrangement may provide a very powerful defense against remote attackers seeking to embed malware into an information handling system platform's firmware. Example information handling system configurations for handling the secure boot policy are described herein and with reference to FIG. 4.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 4:
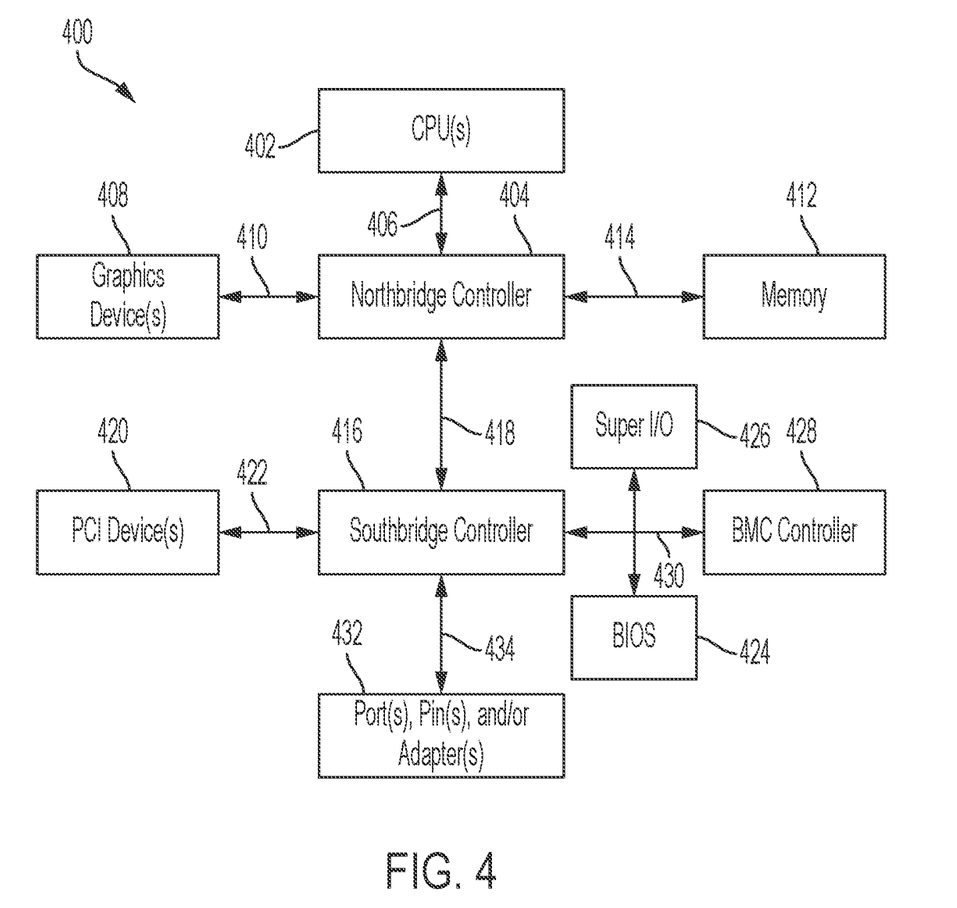
FIG. 4 is a schematic block diagram of an example information handling system according to some embodiments of the disclosure.

An information handling system may include a variety of components to generate, process, display, manipulate, transmit, and receive information. One example of an information handling system 400 is shown in FIG. 4. IHS 400 may include one or more central processing units (CPUs) 402, such as CPU SOCs described above. In some embodiments, IHS 400 may be a single-processor system with a single CPU 402, while in other embodiments IHS 400 may be a multi-processor system including two or more CPUs 402 (e.g., two, four, eight, or any other suitable number). CPU(s) 402 may include any processor capable of executing program instructions. For example, CPU(s) 402 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 402 may commonly, but not necessarily, implement the same ISA.

CPU(s) 402 may be coupled to northbridge controller or chipset 404 via front-side bus 406. The front-side bus 106 may include multiple data links arranged in a set or bus configuration. Northbridge controller 104 may be configured to coordinate I/O traffic between CPU(s) 402 and other components. For example, northbridge controller 404 may be coupled to graphics device(s) 408 (e.g., one or more video cards or adaptors, etc.) via graphics bus 410 (e.g., an Accelerated Graphics Port or AGP bus, a Peripheral Component Interconnect or PCI bus, etc.). Northbridge controller 404 may also be coupled to system memory 412 via memory bus 414. Memory 412 may be configured to store program instructions and/or data accessible by CPU(s) 402. In various embodiments, memory 412 may be implemented using any suitable memory technology, such as static RAM (SRAM), synchronous dynamic RAM (SDRAM), nonvolatile/Flash-type memory, or any other type of memory.

Northbridge controller 404 may be coupled to southbridge controller or chipset 416 via internal bus 418. Generally, southbridge controller 416 may be configured to handle various of IHS 400's I/O operations, and it may provide interfaces such as, for instance, Universal Serial Bus (USB), audio, serial, parallel, Ethernet, etc., via port(s), pin(s), and/or adapter(s) 432 over bus 434. For example, southbridge controller 416 may be configured to allow data to be exchanged between IHS 400 and other devices, such as other IHSs attached to a network. In various embodiments, southbridge controller 416 may support communication via wired or wireless data networks, such as any via suitable type of Ethernet network, via telecommunications/telephony networks such as analog voice networks or digital fiber communications networks, via storage area networks such as Fiber Channel SANs, or via any other suitable type of network and/or protocol.

Southbridge controller 416 may also enable connection to one or more keyboards, keypads, touch screens, scanning devices, voice or optical recognition devices, or any other devices suitable for entering or retrieving data. Multiple I/O devices may be present in IHS 400. In some embodiments, I/O devices may be separate from IHS 400 and may interact with IHS 100 through a wired or wireless connection. As shown, southbridge controller 416 may be further coupled to one or more PCI devices 420 (e.g., modems, network cards, sound cards, video cards, etc.) via PCI bus 422. Southbridge controller 416 may also be coupled to Basic I/O System (BIOS) 424, Super I/O Controller 426, and Baseboard Management Controller (BMC) 428 via Low Pin Count (LPC) bus 430.

IHS 400 may be configured to access different types of computer-accessible media separate from memory 412. Generally speaking, a computer-accessible medium may include any tangible, non-transitory storage media or memory media such as electronic, magnetic, or optical media, including a magnetic disk, a hard drive, a CD/DVD-ROM, and/or a Flash memory. Such mediums may be coupled to IHS 400 through various interfaces, such as universal serial bus (USB) interfaces, via northbridge controller 104 and/or southbridge controller 416. Some such mediums may be coupled to the IHS through a Super I/O Controller 426 combines interfaces for a variety of lower bandwidth or low data rate devices. Those devices may include, for example, floppy disks, parallel ports, keyboard and mouse and other user input devices, temperature sensors, and/or fan speed monitoring.

BIOS 424 may include non-volatile memory having program instructions stored thereon. The instructions stored on the BIOS 424 may be usable by CPU(s) 402 to initialize and test other hardware components. The BIOS 424 may further include instructions to load an Operating System (OS) for execution by CPU(s) 402 to provide a user interface for the IHS 400, with such loading occurring during a pre-boot stage. In some embodiments, firmware execution facilitated by the BIOS 424 may include execution of program code that is compatible with the Unified Extensible Firmware Interface (UEFI) specification, although other types of firmware may be used.

BMC controller 428 may include non-volatile memory having program instructions stored thereon that are usable by CPU(s) 102 to enable remote management of IHS 400. For example, BMC controller 428 may enable a user to discover, configure, and/or manage BMC controller 428. Further, the BMC controller 428 may allow a user to setup configuration options, resolve and administer hardware or software problems, etc. Additionally or alternatively, BMC controller 428 may include one or more firmware volumes, each volume having one or more firmware files used by the BIOS firmware interface to initialize and test components of IHS 400.

One or more of the devices or components shown in FIG. 4 may be absent, or one or more other components may be added. Further, in some embodiments, components may be combined onto a shared circuit board and/or implemented as a single integrated circuit (IC) with a shared semiconductor substrate. For example, northbridge controller 404 may be combined with southbridge controller 416, and/or be at least partially incorporated into CPU(s) 402. Accordingly, systems and methods described herein may be implemented or executed with other computer system configurations. In some cases, various elements shown in FIG. 4 may be mounted on a motherboard and enclosed within a chassis of the IHS 400.

The schematic flow chart diagram of FIG. 2 and FIG. 3 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc include compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to security of information handling systems with different kinds of processors, such as graphics processing units (GPUs), central processing units (CPUs), application specific integrated circuits (ASICs), and digital signal processors (DSPs). As another example, although processing of certain kinds of data may be described in example embodiments, other kinds or types of data, such as different aspects and/or characteristics of the information handling system for securing the system may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   determining, by a processor executing a Basic Input/Output System (BIOS) system firmware stored in a non-volatile memory after initiating a power-on self-test (POST), that a processor coupled to the non-volatile memory is a neutral processor;
   determining, by the BIOS in response to the processor being determined to be a neutral processor, whether a secure boot policy is present in the non-volatile memory;
   in response to determining that the secure boot policy is present in the non-volatile memory:
      determining whether the secure boot policy is authentic;
      assigning a default boot policy to the neutral processor in response to the determining whether the secure boot policy is authentic indicates the secure boot policy is not authentic; and
      assigning the secure boot policy to the neutral processor in response to the determining whether the secure boot policy is authentic indicates the secure boot policy is authentic.

2. The method of claim 1, further comprising: in response to determining that the secure boot policy is not present in the non-volatile memory, assigning the default boot policy to the neutral processor.

3. The method of claim 1, further comprising:
   after assigning the default boot policy, receiving a user input indicating whether to fuse the neutral processor; and
   booting an operating system without fusing the neutral processor based on the user input.

4. The method of claim 1, further comprising:
   after assigning the default boot policy, receiving a user input indicating whether to fuse the neutral processor;
   fusing the neutral processor with an original equipment manufacturer (OEM) key based on the user input to configure the neutral processor to establish a chain of trust from a root of trust of the neutral processor to the BIOS and from the BIOS to an operating system; and
   booting the operating system after fusing the neutral processor.

5. The method of claim 1, wherein determining whether the secure boot policy is authentic comprises determining whether a signature on the secure boot policy is valid based on a public key.

6. The method of claim 5, wherein determining whether the secure boot policy is authentic further comprises determining whether platform-specific identification information of the secure boot policy matches identification information associated with an information handling system in which the neutral CPU is installed.

7. The method of claim 6, wherein determining whether platform-specific identification information matches the information handling system comprises determining whether a motherboard electronic piece part identification (ePPID) of the secure boot policy matches identification information associated with a motherboard of the information handling system.

8. The method of claim 1, wherein determining whether a secure boot policy is present in a non-volatile memory comprises determining whether the secure boot policy is present in a one-time-programmable (OTP) storage of the non-volatile memory.

9. An information handling system, comprising:
a processor; and
a non-volatile memory coupled to the processor,
wherein the processor is configured to execute a system firmware stored in the non-volatile memory to configure the processor to perform steps comprising:
determining that the processor is a neutral processor;
determining, in response to the processor being determined to be a neutral processor, whether a secure boot policy is present in the non-volatile memory;
in response to determining the secure boot policy is present in the non-volatile memory:
determining whether the secure boot policy is authentic;
assigning a default boot policy to the neutral processor when the determining indicates the secure boot policy is not authentic; and
assigning the secure boot policy to the neutral processor when the determining indicates the secure boot policy is authentic.

10. The information handling system of claim 9, wherein the processor is further configured by the system firmware to assign the default boot policy to the neutral processor in response to determining that the secure boot policy is not present in the non-volatile memory.

11. The information handling system of claim 9, wherein the processor is further configured by the system firmware to:
receive a user input indicating whether to fuse the neutral processor;
fuse the neutral processor with an original equipment manufacturer (OEM) key based on the user input to configure the neutral processor to establish a chain of trust from a root of trust of the neutral processor to the BIOS and from the BIOS to an operating system; and
booting the operating system after fusing the neutral processor.

12. The information handling system of claim 9, wherein determining whether the secure boot policy is authentic comprises determining whether a signature on the secure boot policy is valid based on a public key.

13. The information handling system of claim 12, wherein determining whether the secure boot policy is authentic further comprises determining whether platform-specific identification information of the secure boot policy matches identification information associated with the information handling system in which the neutral processor is installed.

14. The information handling system of claim 13, wherein determining whether platform-specific identification information matches identification information associated with the information handling system comprises determining whether a motherboard electronic piece part identification (ePPID) of the secure boot policy matches a motherboard of the information handling system.

15. The information handling system of claim 9, wherein determining whether a secure boot policy is present in a non-volatile memory comprises determining whether the secure boot policy is present in a one-time-programmable (OTP) storage of a BIOS flash part.

16. A computer program product, comprising:
a non-transitory computer readable medium comprising instructions that, when executed by a processor of an information handling system, causes the processor to perform steps comprising:
determining that the processor is a neutral processor;
determining, in response to the processor being determined to be a neutral processor, whether a secure boot policy is present in a non-volatile memory;
in response to determining the secure boot policy is present in the non-volatile memory:
determining whether the secure boot policy is authentic;
assigning a default boot policy to the neutral processor when the determining indicates the secure boot policy is not authentic; and
assigning the secure boot policy to the neutral processor when the determining indicates the secure boot policy is authentic.

17. The computer program product of claim 16, wherein the instructions further configure the processor to assign the default boot policy to the neutral processor in response to determining that the secure boot policy is not present in the non-volatile memory.

18. The computer program product of claim 16, wherein the instructions further configure the processor to perform steps comprising:
after assigning the default boot policy, receiving a user input indicating whether to fuse the neutral processor; and
booting an operating system without fusing the neutral processor based on the user input.

19. The computer program product of claim 16, wherein determining whether the secure boot policy is authentic comprises determining whether a signature on the secure boot policy is valid based on a public key.

20. The computer program product of claim 19, wherein determining whether the secure boot policy is authentic further comprises determining whether platform-specific identification information of the secure boot policy matches platform-specific identification information associated with an information handling system in which the neutral CPU is installed.

* * * * *